(12) United States Patent
Kelley et al.

(10) Patent No.: US 7,243,982 B2
(45) Date of Patent: Jul. 17, 2007

(54) OPERATOR'S CAB FOR A WORK MACHINE

(75) Inventors: Craig Baker Kelley, Dunlap, IL (US);
Ashley D. Menges, Peoria, IL (US);
Jeffrey Alan Brush, Dunlap, IL (US);
Michael T. Baltes, Mapleton, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 11/007,316

(22) Filed: Dec. 9, 2004

(65) Prior Publication Data

US 2005/0280286 A1 Dec. 22, 2005

Related U.S. Application Data

(60) Provisional application No. 60/581,370, filed on Jun. 22, 2004.

(51) Int. Cl.
*B62D 33/06* (2006.01)

(52) U.S. Cl. .................................. 296/190.08

(58) Field of Classification Search ........... 296/190.08, 296/190.01, 190.1, 190.11; 172/4.5, 63, 172/197, 199, 684.5, 779–781, 811; 180/89.13
See application file for complete search history.

(56) References Cited

U.S. PATENT DOCUMENTS

| D131,591 S | 3/1942 | Keller |
| 2,464,696 A | 3/1949 | Lelong |
| 3,158,395 A | 11/1964 | Smith |
| 3,802,530 A | 4/1974 | Purcell et al. |
| 3,866,969 A | 2/1975 | Sandrock et al. |
| D242,816 S | 12/1976 | Maurer |
| RE29,123 E | 1/1977 | Malm et al. |
| 4,007,958 A | 2/1977 | Peifer et al. |
| 4,062,582 A | 12/1977 | Youmans |
| D259,045 S | 4/1981 | Mende |
| 4,605,259 A * | 8/1986 | Hurlburt ............... 296/190.08 |

(Continued)

FOREIGN PATENT DOCUMENTS

EP  0 608 422 A  8/1994

(Continued)

OTHER PUBLICATIONS

U.S. Appl. No. 11/214,904, filed Aug. 31, 2005.

*Primary Examiner*—H Gutman
(74) *Attorney, Agent, or Firm*—Finnegan, Henderson, Farabow, Garrett & Dunner (57) ABSTRACT

An operator's cab for a work machine includes a ceiling structure and a floor structure. An operator's station is disposed between the ceiling structure and the floor structure, and is configured to position an operator in a driving position. First and second vertical support bars extend from the ceiling structure to the floor structure. The first and second vertical support bars are disposed forwardly of the operator's station and are spaced a substantially equal distance from a longitudinal axis of the work machine. Third and fourth vertical support bars also extend from the ceiling structure to the floor structure. The third and fourth vertical support bars are spaced a substantially equal distance from the longitudinal axis. The distance from the first and second vertical support bars to the longitudinal axis is less than the distance from the third and fourth vertical support bars to the longitudinal axis.

15 Claims, 7 Drawing Sheets

U.S. PATENT DOCUMENTS

| | | | | |
|---|---|---|---|---|
| 4,652,043 A | * | 3/1987 | Hurlburt | 296/190.11 |
| 5,413,188 A | * | 5/1995 | Ui | 180/89.12 |
| 5,584,346 A | | 12/1996 | Sakamoto et al. | |
| 5,636,867 A | | 6/1997 | McNabb et al. | |
| 5,906,411 A | | 5/1999 | Stauffer et al. | |
| 6,148,688 A | * | 11/2000 | Nishimaki | 74/493 |
| 6,149,228 A | | 11/2000 | O'Neill et al. | |
| 6,189,954 B1 | | 2/2001 | Martin, Jr. | |
| 6,276,749 B1 | | 8/2001 | Okazawa et al. | |
| 6,523,617 B2 | * | 2/2003 | McGugan | 172/4.5 |
| 6,755,270 B2 | * | 6/2004 | Saarinen | 180/89.13 |
| 2002/0121397 A1 | | 9/2002 | Saarinen | |
| 2004/0163865 A1 | | 8/2004 | Shimokakiuchi et al. | |

FOREIGN PATENT DOCUMENTS

| | | |
|---|---|---|
| EP | 1 380 497 A | 1/2004 |

* cited by examiner

OPERATOR'S CAB FOR A WORK MACHINE

This application claims priority to U.S. Provisional application 60/581,370, filed Jun. 22, 2004, which is incorporated herein by reference.

TECHNICAL FIELD

This disclosure is directed to an operator's cab and, more particularly, to an operator's cab for a work machine such as, for example, a motor grader.

BACKGROUND

An operator's cab for a motor grader typically includes a number of controls for operating the working tools on the motor grader. For example, one known motor grader uses sixteen different control levers to operate the motor grader work tool. The controls extend across the front of the operator's cab for easy access by the operator. Because so many controls are placed in front of the operator, operating cabs are typically of a generally square configuration. Because the operator sits behind the controls, he may not have a view of the work tool and/or the front wheels of the motor grader. Accordingly, during use, to get a proper view of the work tool, an operator may be required to stand or otherwise move within the operator's cab to a position where he has increased visibility.

In addition to providing a housing for the controls of the motor grader, an operator's cab should also be structurally sound. For example, the operator's cab must be designed to protect an operator in the event of a roll-over. A support structure capable of withstanding such loads may include vertical support bars extending from the top to the bottom of the operator's compartment. Because operator's cabs are typically square, the vertical support bars may be placed at the corners. Vertical support bars at these locations are typically in the line of sight of an operator and located directly between the operator and the work tool, such as the blade. Thus, the operator's view of the work tool may be impaired. Improvements in the visibility of an operator may increase efficiency and productivity of the operator running the motor grader. Increases in efficiency and productivity reduce costs.

U.S. Pat. No. 3,866,969 to Sandrock et al. discloses an operator's cab on a rubber tire front end loader. The operator's cab includes a front windshield that appears to be angled to the center of the cab from a side of the cab. However, the operator's compartment disclosed in the '969 patent does not increase the viewing area sufficient for a motor grader. In addition, the location of the vertical support bars still would obstruct an operator's view when such an operator's compartment would be used on a motor grader. Accordingly, the operator's compartment in the '969 patent does not disclose a system that would sufficiently increase visibility of an operator to the work tools of the motor grader.

The disclosed operator's cab overcomes one or more of the deficiencies of the prior art by increasing an operator's viewing area.

SUMMARY OF THE INVENTION

In one aspect, this disclosure is directed to an operator's cab for a work machine. The operator's cab includes a ceiling structure and a floor structure. An operator's station is disposed between the ceiling structure and the floor structure, and is configured to position an operator in a driving position. First and second vertical support bars extend from the ceiling structure to the floor structure. The first and second vertical support bars are disposed forwardly of the operator's station and are spaced a substantially equal distance from a longitudinal axis of the work machine. Third and fourth vertical support bars also extend from the ceiling structure to the floor structure. The third and fourth vertical support bars are spaced a substantially equal distance from the longitudinal axis. The distance from the first and second vertical support bars to the longitudinal axis is less than the distance from the third and fourth vertical support bars to the longitudinal axis.

In another aspect, an operator's cab for a work machine is disclosed. The operator's cab includes a ceiling structure and a floor structure. A first and a second vertical support bar extend between the ceiling structure and the floor structure. An operator's station in the operator's cab is configured to position an operator in a driving position. A central region of the operator's station defines an index axis extending substantially perpendicular to an area of the operator's station. A first index angle is defined between a longitudinal axis of the work machine and a line extending from the index axis to the first vertical support bar. Likewise, a second index angle is defined between the longitudinal axis and a line extending from the index axis to the second vertical support bar. The first vertical support bar is disposed such that the first index angle is less than about 30 degrees and the second vertical support bar is disposed such that the second index angle is greater than about 70 degrees. The difference between the first index angle and the second index angle defines a viewing angle that is unobstructed by a vertical support bar.

DETAILED DESCRIPTION

Reference will now be made in detail to exemplary embodiments that are illustrated in the accompanying drawings. Wherever possible, the same reference numbers will be used throughout the drawings to refer to the same or like parts.

Figure 1:
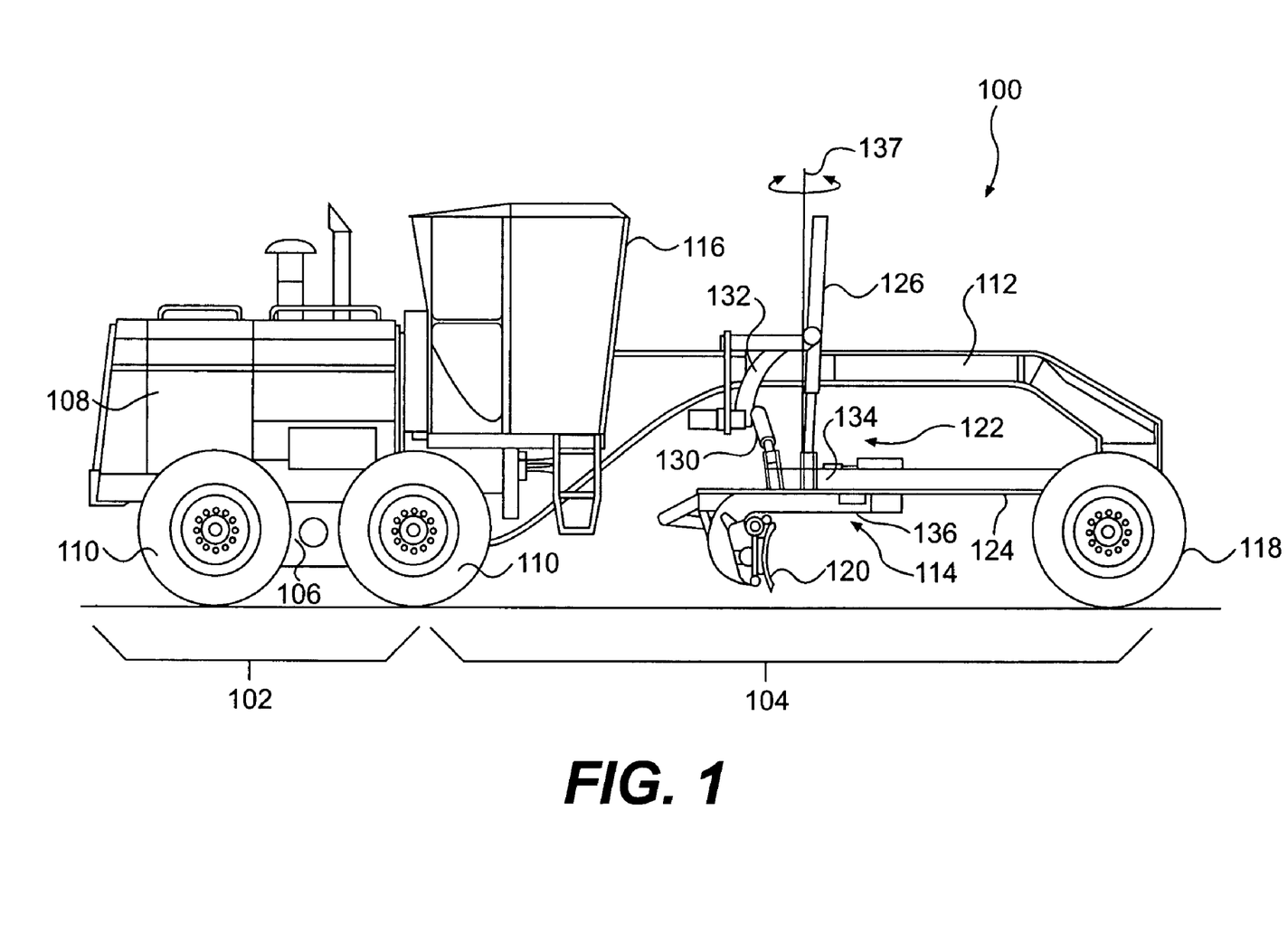
FIG. 1 is a pictorial representation of a side view of an exemplary motor grader.
Figure 2:
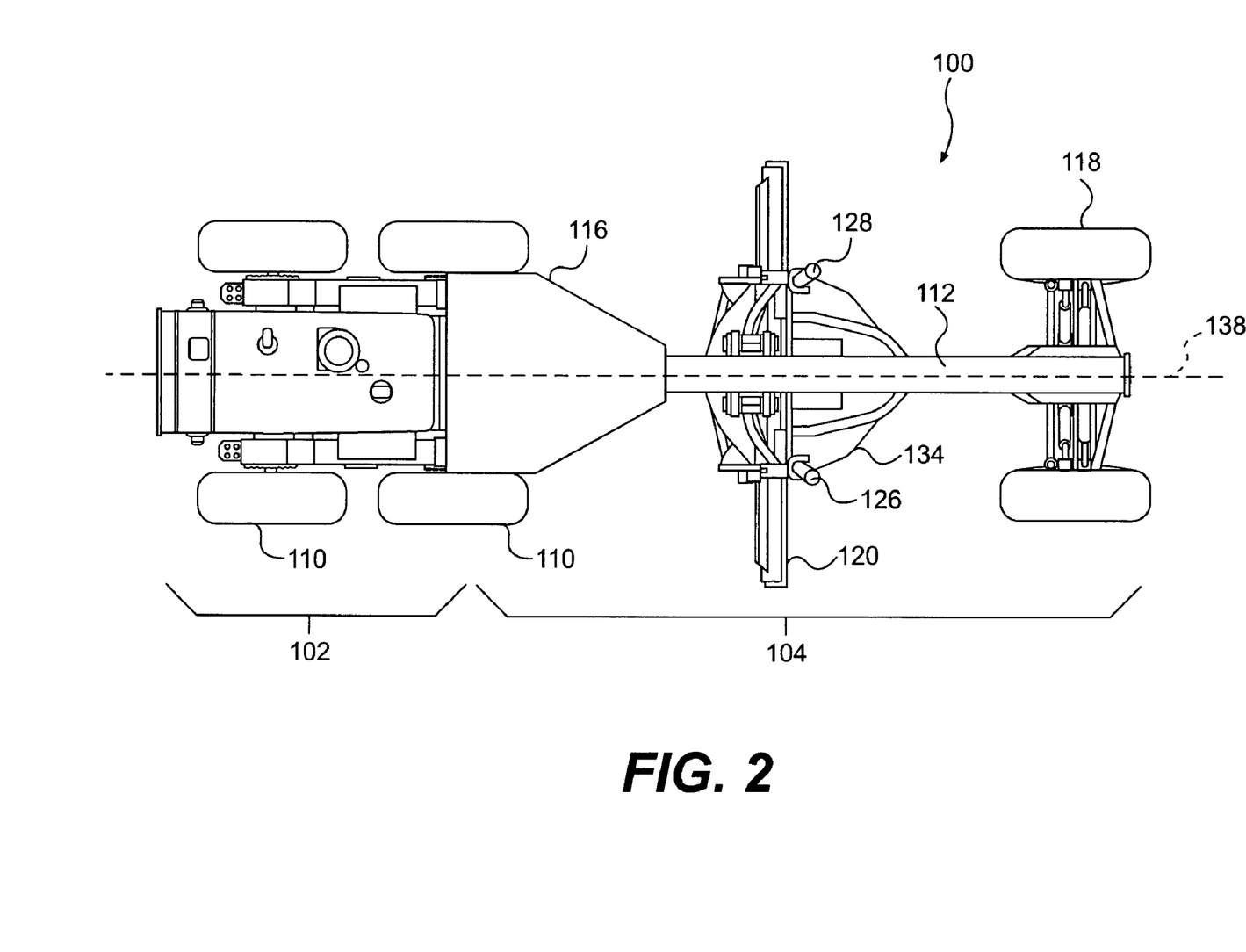
FIG. 2 is a pictorial representation of a top view of the exemplary motor grader of FIG. 1.

An exemplary embodiment of a motor grader 100 is illustrated in FIGS. 1 and 2. The motor grader 100 includes a rear frame section 102 and a front frame section 104. The rear frame section 102 includes a rear frame 106 and an engine in an engine compartment 108. The engine in the engine compartment 108 is mounted on the rear frame 106 and drives or powers rear wheels 110 on the motor grader 100. While this particular embodiment is a motor grader, it is understood that the disclosed operator's cab may have applications in other work machines.

The front frame section 104 includes a front frame 112, a blade assembly 114, and an operator cab 116. The front frame 112 extends from front wheels 118 to the rear wheels 110 and supports the operator cab 116. The operator cab 116 contains the many controls necessary to operate the motor grader 100.

The blade assembly 114 includes a blade 120 and a linkage assembly 122 that allows the blade 120 to be moved to a variety of different positions relative to the motor grader 100. The linkage assembly 122 includes a drawbar 124, a right lift cylinder 126, a left lift cylinder 128 (FIG. 2), a center shift cylinder 130, and a coupling 132.

The drawbar 124 is mounted to the front frame 112, and its position is controlled by the right lift cylinder 126, the left lift cylinder 128, and the center shift cylinder 130. The coupling 128 connects the three cylinders 126, 128, and 130 to the front frame 112. The coupling 128 can be moved during blade repositioning, but is fixed stationary during earthmoving operations. The height of the blade 120 is controlled primarily with the right and left lift cylinders 126, 128. The right and left lift cylinders 126, 128 may be controlled independently and, thus, may be used to angle the blade 120 relative to the ground. The center shift cylinder 130 is used primarily to sideshift the drawbar 124, and all the components mounted to the end of the drawbar 124, relative to the front frame 112.

The drawbar 124 includes a large, flat plate, commonly referred to as a yoke plate 134, as shown in FIG. 2. Beneath the yoke plate 134 is a large gear or circle 136 (FIG. 1). The circle 136 may be rotated using methods known in the art to pivot the blade 120 about a blade axis 137 to establish a blade cutting angle. The motor grader 100 includes a longitudinal axis 138 that defines a centerline of the motor grader in this exemplary embodiment.

Figure 3:
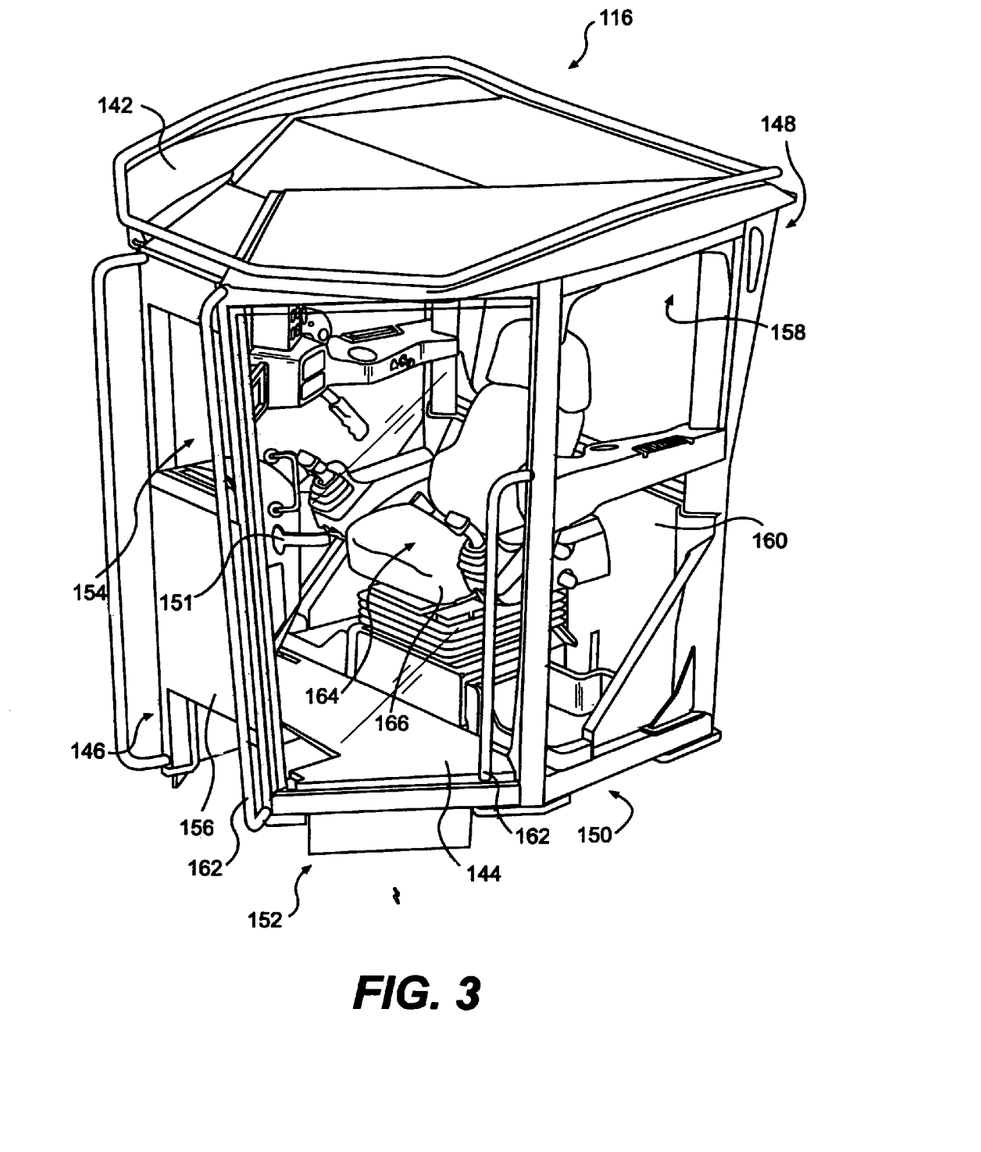
FIG. 3 is a pictorial representation of an exemplary operator's cab for a motor grader.

FIG. 3 is an isometric view of the operator's cab 116 separate from the motor grader 100. The operator's cab 116 includes a ceiling structure 142, a floor structure 144, a front wall 146, and a back wall 148. In addition, the operator's cab 116 includes sidewalls 150 and oblique walls 152. The front wall 146 includes a front window 154 and a front panel 156. The front panel 156 may connect directly to the front frame 112 (shown in FIGS. 1 and 2) of the motor grader 100. The back wall 148 includes a back window 158 and a back panel 160. The back panel 160 may connect directly to the rear frame 106 (shown in FIGS. 1 and 2) of the motor grader 100.

The side walls 150 and the oblique walls 152 connect the front and back walls 146, 148. The side walls 150 are generally perpendicular to the front and back walls 146, 148, while, as shown in FIG. 3, the oblique walls 152 angle from the side walls 150 toward the front wall 146. Although the side and oblique walls 150, 152 are described as walls, it should be apparent that they could be openings or could be formed of a transparent material such as glass or plastic. Accordingly, an operator in the operator's cab 116 may be capable of looking through the side and oblique walls 150, 152. It should be noted that in one exemplary embodiment, portions of the side and oblique walls 150, 152 may not be transparent. In one exemplary embodiment, the oblique walls 152 may form an entry or doorway into the operator's cab 116. The door 151 may also be formed substantially of a transparent material, such as a glass or plastic. In another exemplary embodiment, the oblique walls 152 may include a horizontal bar extending cross-wise to provide support.

Two entry handles 162 are shown on the exemplary operator's cab 116. The entry handles 162 may be bars or handles placed for the convenience of the operator, and may be used when entering the cab, or climbing a ladder into the cab. Within the operator's cab 116, a chair defining an operator's station 164 may be disposed. The chair includes a front edge 166 and positions the operator in a driving position.

Figure 4:
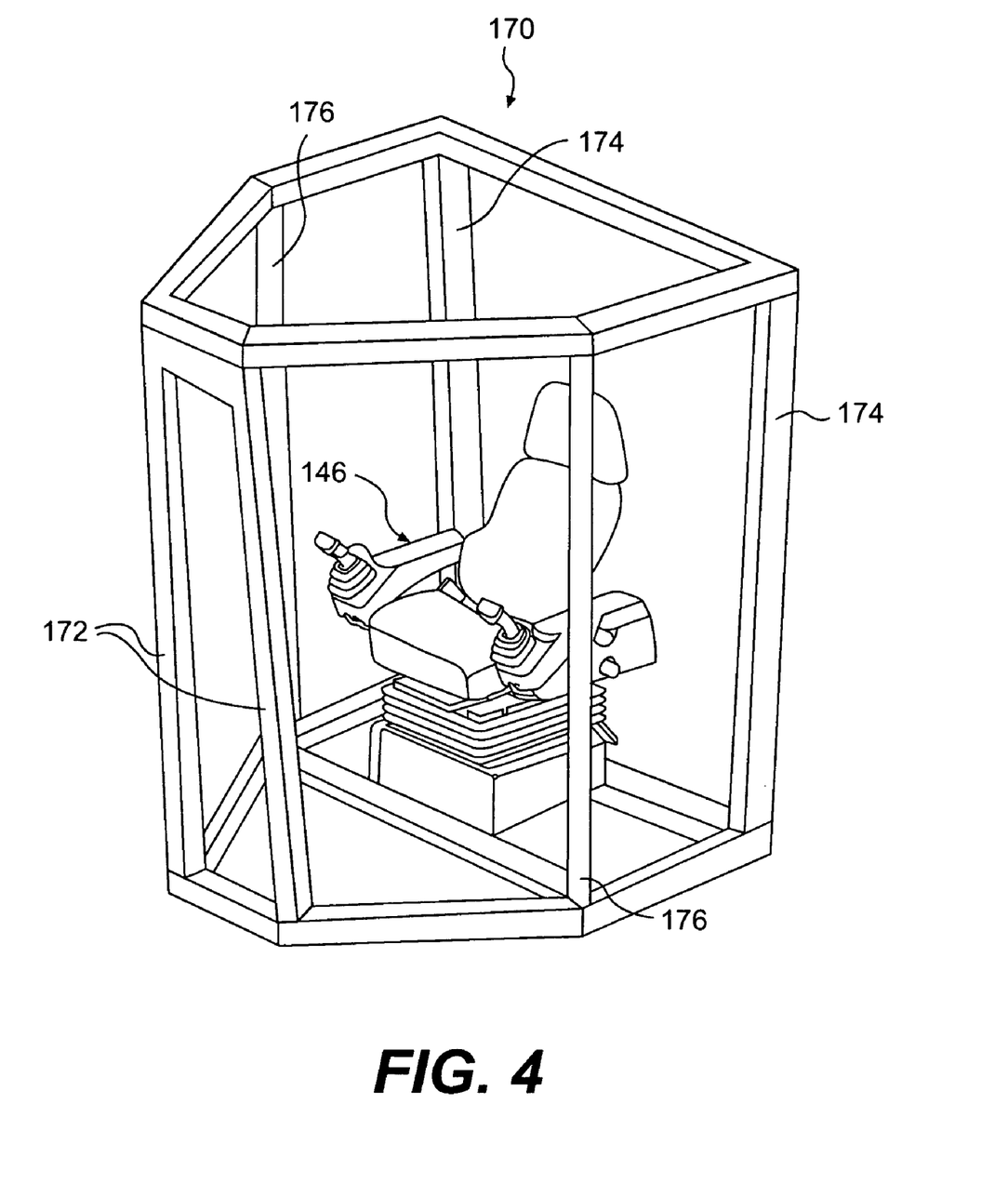
FIG. 4 is an exemplary support structure used in the operator's cab of FIG. 3.

FIG. 4 shows a support structure 170 of the operator's cab 116. The support structure 170 may be capable of withstanding the weight of the motor grader 100, thereby protecting an operator in the event of a rollover. The support structure 170 includes vertical support bars extending from the floor structure to the ceiling structure, such as front vertical support bars 172, back corner vertical support bars 174, and side vertical support bars 176. The area between the front vertical support bars 172 and the side support bars 176 form the oblique wall 152 of FIG. 3. The area between the back corner vertical support bars 174 defines the back wall 148 of FIG. 3. Likewise, the area between the side support bars 176 and the back corner vertical support bars 174 defines the side walls 150 of FIG. 3. In the exemplary embodiment shown, each of the vertical support bars is disposed at an angle such that the support bars are closer together at the floor structure 144 than at the ceiling structure 142. Thus, each of the vertical support bars 172, 174, 176 may lean outwardly and away from the operator's station 164, such that a top portion of the vertical support bars is positioned farther away from the operator's station than a bottom portion of the vertical support bars. Because of this, the front window 154 also leans outwardly and away from the operator's station 164. In one exemplary embodiment, only the front vertical support bars 172 lean outwardly, while in another embodiment, the front and side vertical support bars 172, 176 lean outwardly. However, the vertical support bars could be substantially vertical or taper inwardly in other exemplary embodiments.

In one exemplary embodiment, horizontal support bars may extend between two or more of the vertical support bars 172, 174, 176. Other configurations may be used as would be apparent to one skilled in the art. For example, in this exemplary embodiment, the operator's cab 116 includes two front vertical support bars 172. However, it should be apparent to one skilled in the art that one vertical support bar could be provided.

Figure 5:
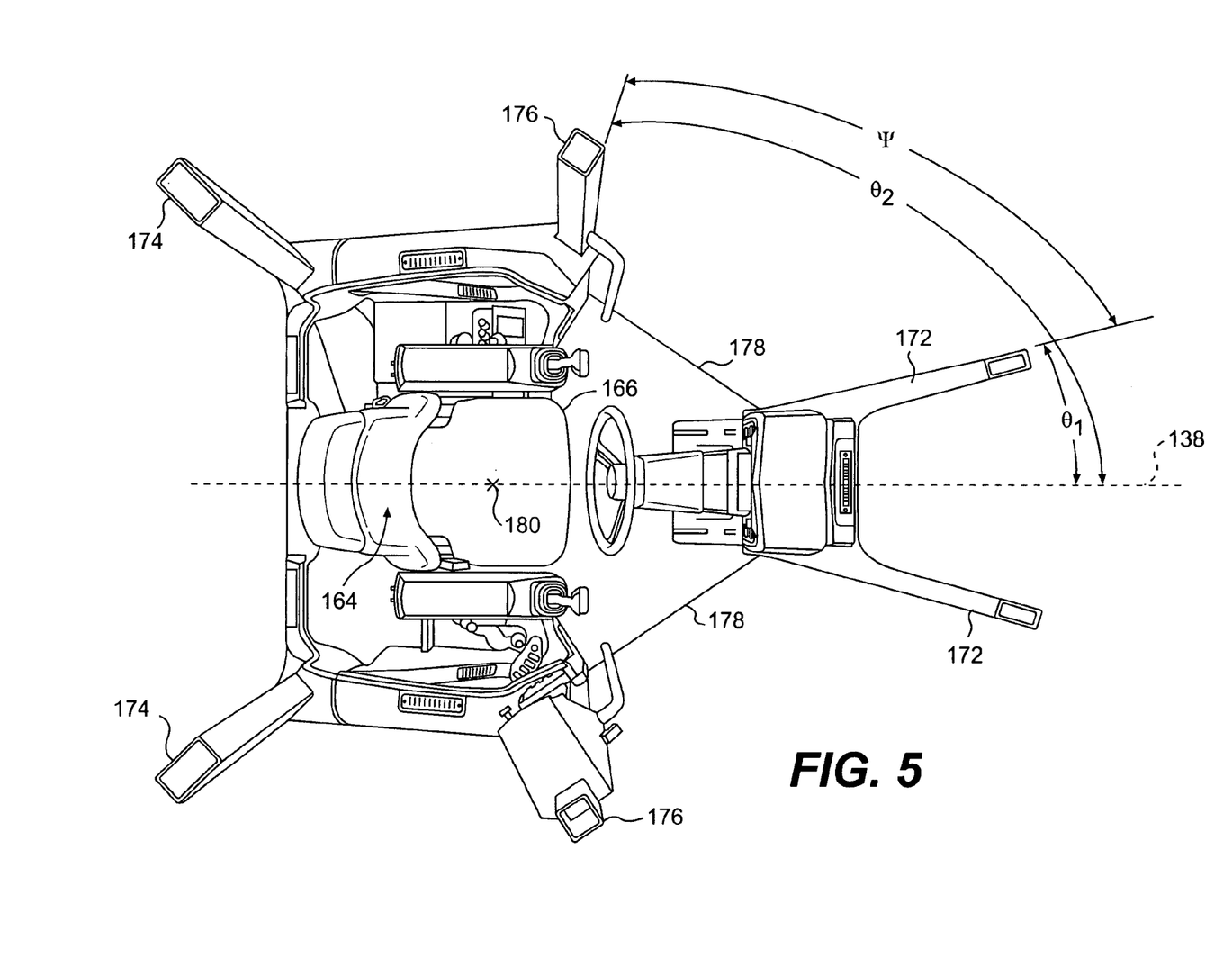
FIG. 5 is a pictorial representation of a top view of the operator's cab of FIG. 3.

FIG. 5 shows the top view of the operator's cab 116 with the ceiling structure removed. In this exemplary embodiment, the front vertical support bars 172 are substantially equally spaced from the longitudinal axis 138. Likewise, the side and rear vertical support bars 174, 176 are substantially equally spaced from the longitudinal axis 138. In this exemplary embodiment, the distance from the front vertical support bars 172 to the longitudinal axis 138 is less than the distance from the side and rear vertical support bars 174, 176 to the longitudinal axis. This enables the floor structure 144 to be beveled, as shown by beveled edges 178 extending from the side walls to the front wall. In one exemplary embodiment, the beveled edge 178 is angled within a range of 20–50 degrees. In one exemplary embodiment, the angle is at around 30 degrees. However, other angles could be used.

In this particular disclosed embodiment, the side and rear vertical support bars 174, 176 form a generally rectangular shape containing substantially all of the operator station 164. As can be seen, the side vertical support bars 176 are disposed adjacent to the operator's station 164. They may also be disposed rearward of the front edge 166 of the operator's station 164.

The operator's station 164 includes an index axis 180, which represents the general position of an operator's eyes, with varying height, when the operator is appropriately seated in the operator's station 164. The index axis 180 may be defined at the operator's station 164 as being a substantially vertical axis (with reference to the base of the operator's seat) extending upward from the central area of an operator seat. It is anticipated that the eyes of an operator in the operator's station 164 may be within a range of about 1.5 to 3.5 feet above the seat of the operator's station, and generally along the index axis 180.

The visibility of an operator will be described with reference to an index angle θ and a viewing angle Ψ. As set forth more clearly below, the index angle θ is the angle formed between the longitudinal axis 138 and a line drawn between the index axis 180 and a vertical support bar. The viewing angle Ψ corresponds to the view of an operator between adjacent vertical support bars. As shown in FIG. 5, the front vertical support bars 172 may be disposed at an index angle $\theta_1$, such as for example, 10 degrees. The next adjacent vertical support bar is disposed at an index angle $\theta_2$, which could be, for example, 80 degrees. By calculating the difference between the two index angles, the viewing angle Ψ, corresponding to the angle unobstructed by vertical support bars relative to an operator, may be determined. In the example shown in FIG. 5, the viewing angle Ψ may be calculated to be 70 degrees. It should be noted that other angles may be used. In one exemplary embodiment, the index angle $\theta_1$ is less than 30 degrees, and the index angle $\theta_2$ is greater than 70 degrees. Thus, the viewing angle Ψ is greater than 40 degrees. In another exemplary embodiment, the index angle $\theta_1$ is less than 20 degrees, and the index angle $\theta_2$ is greater than 70 degrees. Thus, the viewing angle Ψ is greater than 50 degrees. In yet another exemplary embodiment, the index angle $\theta_1$ is less than 15 degrees, and the index angle $\theta_2$ is greater than 70 degrees. Thus, the viewing angle Ψ is greater than 55 degrees.

In one exemplary embodiment, because the viewing angle Ψ is determined in part by the location of the oblique wall 152, which may be a door or entry to the operator's cab 116, the viewing angle Ψ may include a horizontal support bar and/or a door handle. However, the viewing angle does not include a vertical support bar within that range. The index and viewing angles may change when the position of the seat or operator's station is changed relative to the vertical support bars.

Figure 6:
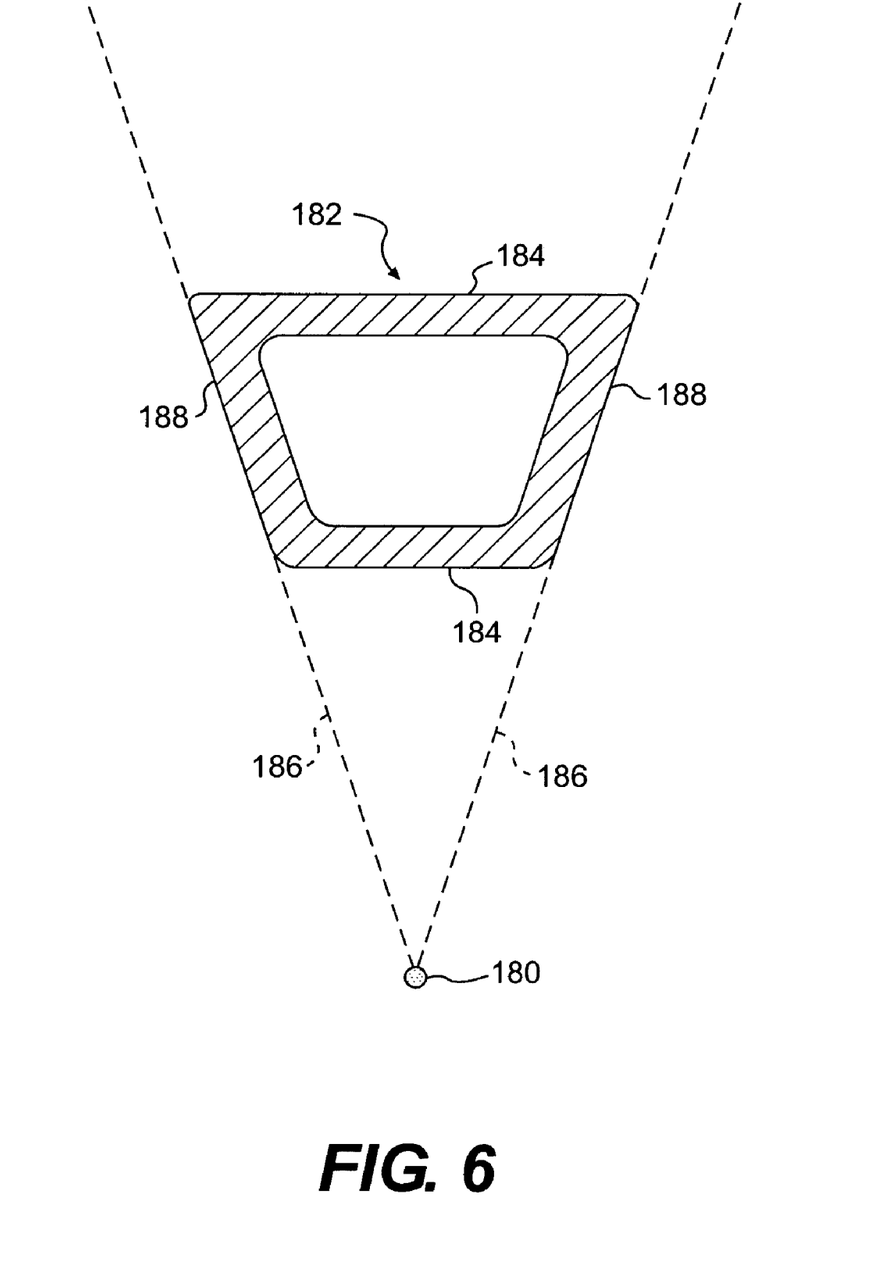
FIG. 6 is a pictorial representation of the cross-section of an exemplary vertical support bar.

FIG. 6 is a cross sectional view of an exemplary vertical support bar 182 that may be used on the operator's cab 116. The vertical support bar 182 is a trapezoid shape, including two substantially parallel surfaces 184. In addition, the vertical support bar 182 includes tapered walls 188 that are aligned with a line of sight 186 of an operator. This configuration enables the operator to have an enhanced viewing area, while still providing a sufficient support structure for the operator cab. In one exemplary embodiment, the vertical support bar 182 has a rectangular shape and is disposed so that the narrow edge of the rectangle is facing the operator's station.

INDUSTRIAL APPLICABILITY

Figure 7:
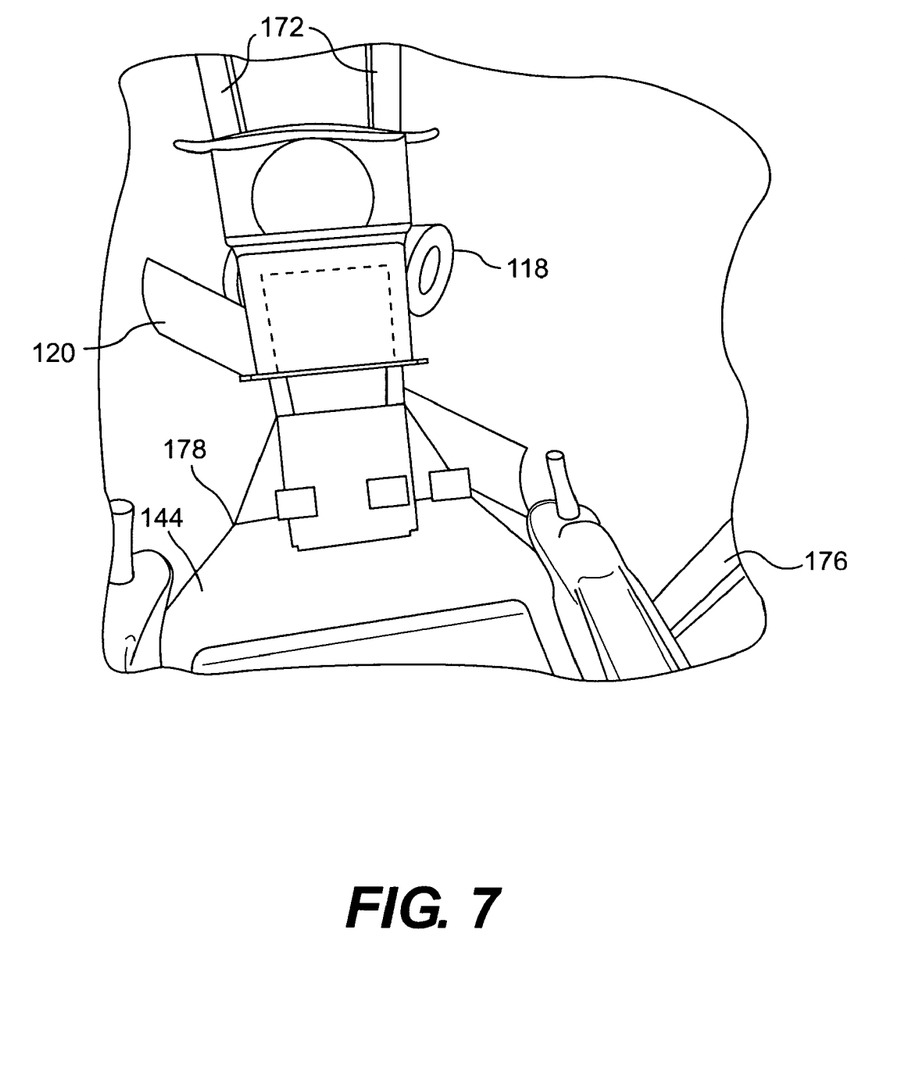
FIG. 7 is a pictorial representation of an operator's view from the operator's cab of FIG. 3.

The operator's cab 116 enhances the visibility of an operator controlling a work machine, such as the motor grader 100. FIG. 7 shows an exemplary view of an operator from the index axis 180 in the operator's cab 116. As shown in FIG. 7, an operator sitting in the operator's station 164 may be able to view working tools of the motor grader 100, such as, for example, the blade 120 and/or the front wheels 118 of the motor grader 100, by looking out the front window 154 and through the transparent area defining the oblique walls 152. As shown in FIG. 7, edges at both ends of the blade 120 are visible. In a preferred embodiment, the operator's cab may be configured to provide no viewing impairment to an operator's ability to view both ends of the blade 120 throughout the blade's full range of rotation. The operator's cab may be configured to provide such a view to an operator in the operator's station 164, when the operator's eyes are disposed generally along the index axis 180, and within the range of about 1.5 to 3.5 feet above the seat of the operator's station 164. In another exemplary embodiment, the operator's cab may be configured to provide such a view when the operator's eyes are disposed generally along the index axis 180, and within the range of about 2 to 3 feet above the seat of the operator's station 164.

Because an operator can more easily view the working components, the operator may require less training and, in addition, work more efficiently. This reduces training costs and increasing productivity. Further, the enhanced visibility afforded by the disclosed operator's cab may be obtained without creating safety concerns. The disclosed operator's cab may be a robust design capable of protecting an operator in the event of a rollover.

It will be apparent to those skilled in the art that various modifications and variations can be made in the disclosed embodiments without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. An operator's cab for a work machine, comprising:
    a ceiling structure;
    a floor structure;
    a first and a second vertical support bar extending between the ceiling structure and the floor structure;
    an operator's station in the operator's cab configured to position an operator in a driving position, a central region of the operator's station defining an index axis extending substantially perpendicular to a seating area of the operator's station;
    a first index angle defined between a longitudinal axis of the work machine and a line extending from the index axis to the first vertical support bar; and
    a second index angle defined between the longitudinal axis and a line extending from the index axis to the second vertical support bar,
    wherein the first vertical support bar is disposed such that the first index angle is less than about 30 degrees, and wherein the second vertical support bar is disposed such that the second index angle is greater than about 70 degrees, and wherein the difference between the first index angle and the second index angle defines a viewing angle, the viewing angle being unobstructed by a vertical support bar.

2. The operator's cab of claim 1, wherein the first vertical support bar is disposed such that the first index angle is less than about 20 degrees.

3. The operator's cab of claim 1, wherein the first vertical support bar is disposed such that the first index angle is less than about 15 degrees.

4. The operator's cab of claim 1, wherein the first vertical support bar is disposed such that the first index angle is less than about 10 degrees and wherein the second vertical support bar is disposed such that the second index angle is greater than about 80 degrees.

5. The operator's cab of claim 1, wherein the operator's station is a seat having a front edge, and wherein the second vertical support bar is disposed rearward of the seat front edge.

6. The operator's cab of claim 1, wherein a door is disposed within the viewing angle.

7. The operator's cab of claim 1, wherein the floor structure is beveled so that a portion of the floor structure in front of the operator's station is more narrow than a portion of floor structure behind the operator's station.

8. The operator's cab of claim 1, wherein a cross-section of at least one of the first and second vertical support bars includes a trapezoidal cross-section.

9. The operator's cab of claim 1, wherein the first vertical support bar is disposed at an incline such that a top portion of the first vertical support bar is positioned farther away from the operator's station than a bottom portion of the first vertical support bar.

10. A motor grader, comprising:
a front frame;
a rear frame disposed adjacent the front frame;
an operator's cab disposed on the front frame, the operator's cab including a ceiling structure, a floor structure, a first vertical support bar, and a second vertical support bar, the first and second vertical support bars extending between the ceiling structure and the floor structure; and
an operator's station in the operator's cab configured to position an operator in a driving position, a central region of the operator's station defining an index axis extending substantially perpendicular to a seating area of the operator's station;
a first index angle defined between a longitudinal axis of the motor grader and a line extending from the index axis to the first vertical support bar; and
a second index angle defined between the longitudinal axis and a line extending from the index axis to the second vertical support bar,
wherein the first vertical support bar is disposed such that the first index angle is less than about 30 degrees, and wherein the second vertical support bar is disposed such that the second index angle is greater than about 70 degrees, and wherein the difference between the first index angle and the second index angle defines a viewing angle, the viewing angle being unobstructed by a vertical support bar.

11. The motor grader of claim 10, wherein the first vertical support bar is disposed such that the first index angle is less than about 15 degrees.

12. The motor grader of claim 10, wherein the first vertical support bar is disposed such that the first index angle is less than about 10 degrees and wherein the second vertical support bar is disposed such that the second index angle is greater than about 80 degrees.

13. The motor grader of claim 10, wherein the operator's station is a seat having a front edge, and wherein the second vertical support bar is disposed rearward of the seat front edge.

14. A motor grader, comprising:
an operator's cab having a ceiling structure and a floor structure;
a chair disposed in the operator's cab and configured to position an operator in a driving position;
a blade disposed forward of the operator's cab; and
front vertical support bars extending from the ceiling structure to the floor structure, the front vertical support bars being disposed forwardly of the chair, and being spaced a substantially equal distance from a longitudinal axis of the motor grader, the front vertical support bars being configured to render both edges of the blade visible to an operator seated in the chair.

15. The motor grader of claim 14, including front wheels, the front vertical support bars being configured to render at least a portion of the front wheels visible to an operator seated in the chair.

* * * * *